United States Patent [19]

Maeda

[11] Patent Number: 4,848,989
[45] Date of Patent: Jul. 18, 1989

[54] IN-LINE FILTER ASSEMBLY FOR COMPRESSED AIR

[75] Inventor: Sadao Maeda, Okazaki, Japan

[73] Assignees: Maeda Shell Service Co., Ltd.; J&M Co., Ltd., both of Aichi, Japan

[21] Appl. No.: 90,370

[22] Filed: Aug. 28, 1987

[30] Foreign Application Priority Data

Aug. 29, 1986 [JP] Japan .............. 61-133311[U]

[51] Int. Cl.$^4$ .............................. B01D 50/00
[52] U.S. Cl. .......................... 55/319; 55/322; 55/DIG. 17; 55/DIG. 25; 55/394; 55/482; 55/323
[58] Field of Search .............. 55/318, 319, 394, 423, 55/323, 482, 441, DIG. 17, DIG. 25, 320-322

[56] References Cited

U.S. PATENT DOCUMENTS

| | | | |
|---|---|---|---|
| 1,896,833 | 2/1933 | Bramsen et al. | 55/322 |
| 2,521,785 | 9/1950 | Goodloe | 55/DIG. 25 X |
| 3,464,186 | 9/1969 | Hankison et al. | 55/DIG. 17 X |
| 3,791,105 | 2/1974 | Rhodes | 55/323 X |
| 3,923,480 | 12/1975 | Visch | 55/321 X |
| 4,015,959 | 4/1977 | Grote | 55/318 X |
| 4,116,650 | 9/1978 | Lane | 55/DIG. 17 X |
| 4,400,187 | 8/1983 | Lane | 55/DIG. 17 X |
| 4,487,618 | 12/1984 | Mann | 55/323 |
| 4,600,416 | 7/1986 | Mann | 55/323 |

FOREIGN PATENT DOCUMENTS

| | | |
|---|---|---|
| 0101555 | 2/1984 | European Pat. Off. . |
| 628501 | 10/1927 | France .............. 55/319 |
| 1499929 | 2/1978 | United Kingdom . |

Primary Examiner—Charles Hart
Attorney, Agent, or Firm—Oliff & Berridge

[57] ABSTRACT

An in-line filter device including a double-walled tube filter assembly, and an upper cap and a lower cap which are held in communication with upper and lower open ends of the filter assembly. The filter assembly has an inner tube and an outer tube which are disposed in radially spaced, and coaxial relation with each other, so as to define an annular space therebetween. One of the inner tube and the annular space is filled with a first pad adapted to coalesce vapor in compressed air passing therethrough, into droplets, while the other of the inner tube and the annular space is filled with a second pad adapted to vaporize residual liquid particles remaining in the compressed air which has passed the first pad. The upper cap has an inlet connected to the upstream side of a compressed air conduit and communicating with the first pad incorporated within the double-walled tube filter assembly. The upper cap further has an outlet connected to the downstream side of the conduit and communicating with the second pad. The lower cap has an enclosed space accommodating a porous trapping structure for trapping the droplets from the first pad, and further has a drain for discharging a mass of the trapped droplets.

4 Claims, 3 Drawing Sheets

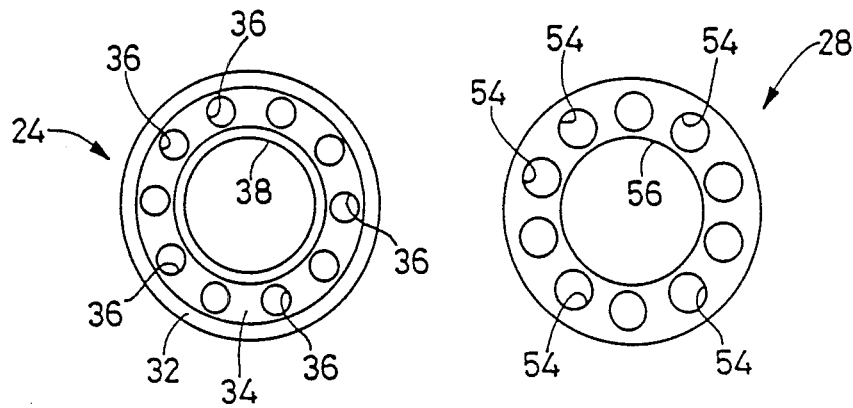
FIG.2 FIG.4
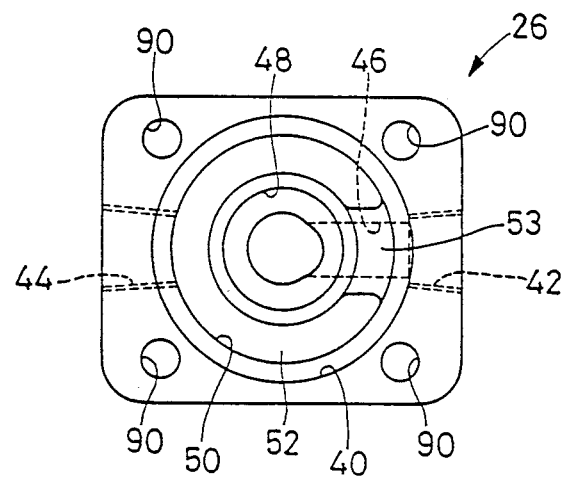
FIG.3

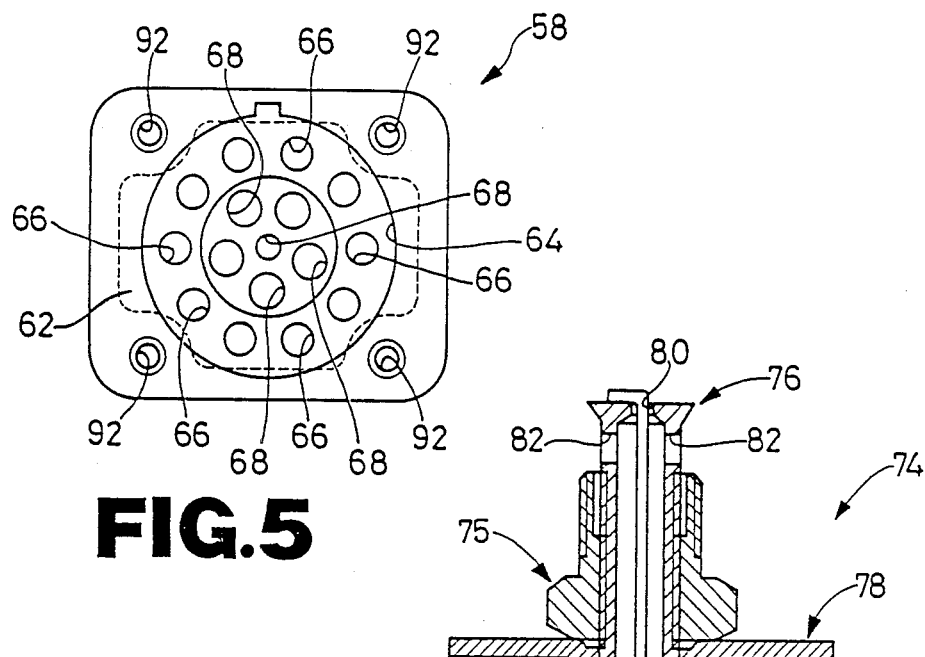
FIG.5
FIG.7
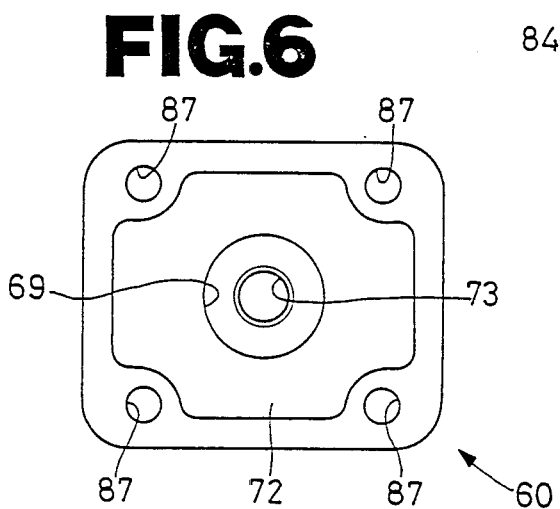
FIG.6

IN-LINE FILTER ASSEMBLY FOR COMPRESSED AIR

BACKGROUND OF THE INVENTION

1. Field of the Invention

The present invention relates generally to an in-line filter device adapted to be connected to a compressed air line, and more particularly to such a compact in-line filter device having excellent efficiency of removal of liquid particles such as water and oil vapor contained in compressed air.

2. Discussion of the Prior Art

Generally, a conduit for supplying compressed air to various pneumatically operated components used in factories and atomic plants and for medical applications, for example, is provided with an in-line filter device for removing water and oil vapor from the compressed air flowing through the conduit, in order to protect the pneumatic components.

Various types of such in-line filter devices have been proposed. For example, U.S. Pat. No. 4,487,618 discloses an in-line filter device (airline vapor trap) capable of removing water and/or oil vapor from a compressed airline, with particularly high efficiency.

More specifically described, the airline vapor trap disclosed in the above-identified document includes a first filter having a first pad or packing of wire mesh fibers such as stainless steel fibers, a second filter having a second pad of an absorbent plug structure comprising cotton fabric, for example, and a hollow base which defines an enclosed volume connecting the first and second filters and which is provided with a drain opening. Vapor or liquid particles contained in incoming compressed air are coalesced into droplets while the compressed air is passed through the first filter, and the droplets are trapped within the enclosed volume of the hollow base. The trapped droplets are discharged through the drain opening. Thus, the vapor or liquid particles are separated from the compressed air. As the compressed air stream thus dried is passed through the second filter, any remaining vapor is vaporized. In this manner, water and oil vapor, and dust are efficiently removed by the in-line vapor trap.

For preventing condensation (liquefaction) of a small volume of remaining vapor which has been vaporized, it is desirable to locate the in-line filter device at a point along the compressed air conduit, which is close to a pneumatic component connected to the conduit. However, the in-line filter device of the type described above tends to be comparatively large-sized, due to laterally spaced-apart arrangement of the first and second filters in the form of two independent cartridges apart from each other in the direction of length of the airline conduit. Accordingly, the filter device requires a relatively large space for installation, and therefore there exists a limitation in the location of the filter device selectable along the length of the conduit. In other words, it is preferred to construct an in-line filter device as compact as possible. In this sense, there remains room for improvement in the construction of an in-line filter device of the type as disclosed in the above-identified document.

Further, the filter device shown in the document has another inconvenience. Namely, the filter assembly consisting of the laterally spaced-apart first and second filters is mounted and clamped between an upper cap in the form of a manifold and a lower cap in the form of the hollow base connecting the two filters. The clamping is accomplished by a plurality of fastening members such as bolts extending between the upper and lower caps. When it becomes necessary to replace the filter cartridges, the fastening members must be removed and re-tightened. However, it is difficult to clamp the filter assembly with even tightening forces applied to the fastening members. Uneven tightening forces will cause a potential leakage of the compressed air at the points of connection between the filter assembly and the upper and lower caps.

SUMMARY OF THE INVENTION

It is therefore an object of the present invention to provide an improved in-line filter device which ameliorates the inconveniences experienced in the conventional counterpart discussed above.

The above object may be attained according to the principle of the present invention, which provides an in-line filter assembly including first filter means having a first pad adapted to coalesce vapor or liquid particles contained in compressed air passing therethrough, into droplets, trapping means for trapping the droplets and thereby separating the droplets from the compressed air, and second filter means having a second pad through which is passed the compressed air which has passed the first filter means, the second pad being adapted to vaporize residual liquid particles remaining in the compressed air which has passed the first filter means, the in-line filter device comprising: (a) a double-walled tube filter assembly including an inner tube and an outer tube which are disposed in radially spaced, and coaxial relation with each other, so as to define an annular space therebetween, one of the inner tube and the annular space being filled with the first pad, so as to provide the first filter means, while the other of the inner tube and the annular space being filled with the second pad, so as to provide the second filter means; (b) an upper cap disposed in sealing engagement with an upper open end of the double-walled tube filter assembly, for fluid-tight communication therewith, the upper cap having an inlet opening which communicates with an upper open end of one of the inner tube and the annular space, and an outlet opening which communicates with an upper open end of the other of the inner tube and the annular space, the inlet opening receiving the incoming compressing air, while the outlet opening being adapted to deliver the filtered compressed air; and (c) a lower cap disposed in sealing engagement with a lower open end of the double-walled tube filter assembly, for fluid-tight communication therewith, the lower cap having an enclosed space which communicates with lower open ends of the inner tube and the annular space, the enclosed space having a volume sufficient to reduce a velocity of the compressed air flowing into the enclosed space after passage thereof through the first filter means. The lower cap includes a porous structure accommodated within the enclosed space, as the trapping means for trapping the droplets formed during passage of the compressed air through the first filter means. The lower cap further includes drain means for discharging a mass of the droplets trapped by the porous structure, out of the filter device.

In the in-line filter device of the present invention constructed as descried above, the first and second filter means are provided in the form of the unitary double-walled tube filter assembly. Therefore, the present filter device can be manufactured effectively compact, and the space required for the connection of the in-line filter device to a compressed-air conduit or line can be considerably reduced. This facilitates the installation of the in-line filter device at an operationally desired location along the length of the compressed-air conduit.

Since the first and second filter means are provided as coaxial inner and outer parts of a single double-walled tubing structure of the filter assembly, the number of fixing bolts when used to clamp the filter assembly between the upper and lower caps can be reduced, as compared with that of the bolts required in the conventional filter device wherein two filter cartridges are disposed in laterally spaced-apart relation with each other. Consequently, the present arrangement permits easy tightening of the fixing bolts with even forces, thereby avoiding leakage of the compressed air due to otherwise possible uneven tightening forces exerted to the bolts.

The filter device constructed according to the invention has a further advantage. Namely, the coaxial alignment of the first and second filter means whose lower open ends are held in communication with each other through the lower cap, makes it possible to locate the porous structure and the drain means at suitable positions within the lower cap, with respect to the direction of flow of the compressed air stream, so that the droplets separated from the compressed air can be effectively trapped by the porous structure and discharged by the drain means with high efficiency.

According to one feature of the invention, the porous structure consists of a honeycomb structure accommodated in a lower portion of the enclosed space within the lower cap, such that passages formed through the honeycomb structure extend vertically in parallel with the inner and outer tubes.

According to another feature of the invention, the drain means is disposed in a central portion of a bottom wall of the lower cap which defines a bottom of the enclosed space, so that the drain means is located right below the lower open end of the inner tube. The bottom wall has an internal concave surface which is inclined downwardly toward the central portion of the bottom wall.

According to a further feature of the invention, the inner tube is filled with the first pad of the first filter means while the annular space between the inner and outer tubes is filled with the second pad of the second filter means.

According to a still further feature of the invention, the lower cap consists of a generally box-like upper half having a top wall in sealing engagement with the lower open ends of the inner tube and the annular space, and a generally box-like lower half having a bottom wall in sealing abutting contact with an open end of the upper half. The porous structure is accomodated in the lower half, and the drain means is supported by the bottom wall of the lower half.

BRIEF DESCRIPTION OF THE DRAWINGS

The above and optional objects, features and advantages of the present invention will become more apparent by reading the following description of a presently preferred embodiment of the invention, when considered in connection with the accompanying drawings in which:

FIG. 2 is a bottom plan view of an upper gasket incorporaed in the filter device of FIG. 1;

FIG. 3 is a bottom plan view of an upper cap member of the filter device;

FIG. 4 is a plan view of a lower gasket of the filter device;

FIG. 5 is a plan view of an upper half of a lower cap member of the filter device;

FIG. 6 is a plan view of a lower half of the lower cap member; and

FIG. 7 is an elevational view in longitudinal cross section of a drain valve used in the present embodiment.

DETAILED DESCRIPTION OF THE PREFERRED EMBODIMENT

Figure 1:
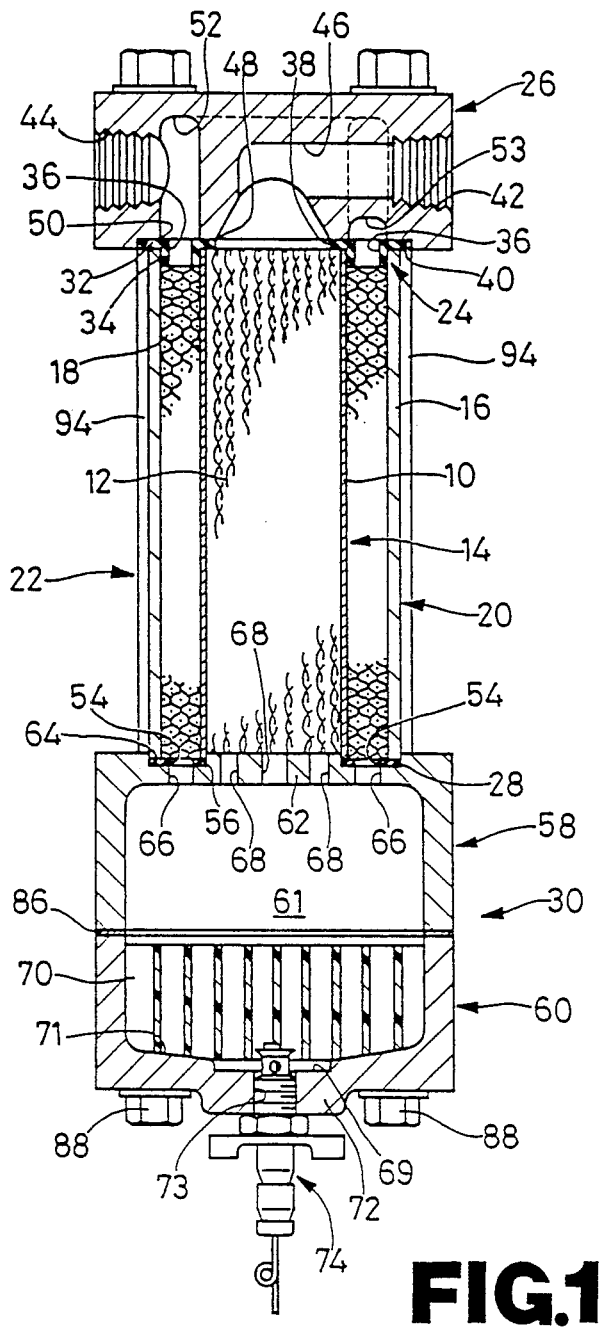
FIG. 1 is an elevational view in longitudinal cross section of one embodiment of an in-line filter device adapted for connection to a compressed air line.

To further clarify the concept of the present invention, the presently preferred embodiment of the invention will be described in detail, by reference to the accompanying drawings.

Referring first to FIG. 1, there is shown the presently preferred embodiment of an in-line filter device of the invention adapted for connection to a compressed air line. In the figure, reference numeral 10 designates an inner tube or inner wall having a cylindrical shape. The inner tube 10 is filled with an inner pad or packing 12 made of wound wire mesh fibers such as stainless steel fibers. The inner tube 10 and the inner pad 12 constitute an inner or first filter 14.

Radially outwardly spaced from the inner tube 10 of the first filter 14, there is disposed an outer tube or outer wall 16 having a cylindrical shape in coaxial relation with the inner cylindrical wall 10. The outer tube 16 has substantially the same length as the inner tube 10, and has a diameter larger than that of the inner tube by a predetermined value. An annular space formed between the inner and outer tube 10, 16 is filled with an outer pad 18 made of wound fabric materials such as cotton fabric. The inner and outer tubes 10, 16 and the outer pad 18 constitute an outer or second filter 20.

It follows from the above description that the instant in-line filter device includes a double-walled tube filter assembly 22 consisting of the first and second filters 14, 20 which include the inner and outer tubes 10, 16 and the inner and outer pads 12, 18.

The double-walled tube filter assembly 22 is mounted at its opposite open ends between an upper cap 26 in the form of a manifold, and a lower cap 30 in the form of a hollow base, via respective upper and lower gaskets 24, 28.

Described more specifically, the upper gasket 24 is an annular L-shaped member which consists of an annular disk portion 32, and an annular ring portion 34 protruding from one of opposite surfaces of the disk portion 32 in an axial direction of the gasket 24, as illustrated in FIGS. 1 and 2. The annular ring portion 34 has a circumferential array of perforations 36 (10 perforations in this specific example) formed through its thickness. The perforations 36 are equally spaced apart from each other in the circumferential direction of the upper gasket 24. This upper gasket 24 is interposed between the upper cap 26 and the upper open end of the second filter 20, such that the annular ring portion 34 is held in sealing engagement with the upper end of the annular space between the inner and outer tubes 10, 16. Thus, the interior of the first filter 14 is held in communication with the interior of the upper cap 26 through a center hole 38 formed in the upper gasket 24, while the interior of the second filter 20 is held in communication with the interior of the upper cap 26 through the circumferential array of perforations 36 formed through the ring portion 34 of the gasket 24.

As shown in FIGS. 1 and 3, the upper cap 26 thus connected to the double-walled tube filter assembly 22 via the upper gasket 24 consists of a generally rectangular block having a pair of opposed surfaces in which are open respective inlet and outlet openings 42, 44 that are formed in laterally spaced, coaxially aligned relation with each other. The rectangular blcok of the upper cap 26 has a bottom surface whose central portion has a circular recess 40, in which is fitted the above-indicated upper gasket 24 so as to assure fluid-tight engagement between the upper cap 26 and the double-walled tube filter assembly 22. The inlet opening 42 adapted to receive incoming compressed air communicates with a passage 46 and a central opening 48 formed through the upper cap 26, such that the central opening 48 is open in a central part of the circular recess 40. On the other hand, the outlet opening 44 adapted to deliver the compressed air communicates with an annular groove 52 which has an annular opening 50 formed radially outwardly of the central circular opening 48, for communication with a peripheral part of the circular recess 40. The annular groove 52 has a shallow portion 53 which has a smaller dimension than the other portion, as measured from the annular opening 50, so that the portion 53 extends below the passage 46, in order to permit the annular groove 52 and the passage 46 to be independent of each other, or to avoid communication therebetween.

As described above, the upper gasket 24 is held in the circular recess 40 formed in the bottom surface of the upper cap 26, such that the annular disk portion 32 is clamped between the upper cap 26, and the faces of the axial ends of the inner and outer tubes 10, 16. Thus, the upper cap 26 closes the upper open end of the double-walled tube filter assembly 22. As is apparent from FIG. 1, the central circular opening 48 communicating with the inlet opening 42 communicates with the interior of the first filter 14 through the center hole 38 formed through the upper gasket 24, while the annular opening 50 of the annular groove 52 communicating with the outlet opening 44 communicates with the interior of the second filter 20 through the perforations 36 formed through the upper gasket 24. Thus, the inlet and outlet openings 42, 44 communicate with the first and second filters 14, 20, respectively, such that the inlet and outlet sides are not in direct communication with each other.

The lower gasket 28 is an annular flat member which has a circumferential array of perforations 54 (10 perforations in this example) formed through its thickness, as shown in FIGS. 1 and 4. The perforations 54 are equally spaced apart from each other in the circumferential direction of the gasket 28. As described below, the lower gasket 28 is disposed between the lower open end of the double-walled tube filter assembly 22 and the lower cap 30, such that the interior of the first filter 14 communicates with the loewr cap 30 through a center hole 56 formed through the lower gasket 28, while the interior of the second filter 20 communicates with the lower cap 30 through the circumferential array of perforations 54.

The lower cap 30 to which the lower open end of the filter assembly 22 is connected via the lower gasket 28, is a generally rectangular housing which has a comparatively large enclosed space 61, and which consists of an upper half 58 and a lower half 60 disposed in sealing abutment with each other, as illustrated in FIG. 1.

Referring further to FIG. 5, the upper half 58 is a rectangular box-like construction having a top wall 62 whose outer surface is held in sealing engagement with the filter assembly 22. The outer surface of the top wall 62 has an annular recess 64 in which the lower gasket 28 is fitted. As most clearly shown in FIG. 5, the annular recess 64 communicates with an outer circumferential array of perforations 66 formed through the top wall 62, in aligned relation with the corresponding perforations 54 formed through the lower gasket 28. The top wall 62 further has an inner array of perforations 68 (six perforations in this example) which are formed radially inwardly of the annular recess 64.

Referring to FIG. 6, the lower half 60 is a rectangular box-like construction similar to the upper half 58, including a bottom wall 72 which has a central circular recess 69 formed in its inner surface. The inner surface of the bottom wall 72 has a concave surface 71 which is inclined downwardly toward the central circular recess 69. Substantially the entire volume defined in the lower half 60 is filled with a porous structure 70 of honeycomb construction which consists of honeycomb blocks which are arranged along the concave surface 71 of the bottom wall 72, such that the passages in the honeycomb blocks are oriented in the vertical direction. The bottom wall 72 has a central threaded hole 73 coaxially aligned and communicating with the central circular recess 69, for receiving a drain valve 74 which will be described.

Referring to FIG. 7, there is shown a preferred example of the drain valve 74, which is disclosed in laid-open Publication No. 62-99313 (published on June 24, 1987) of Japanese Utility Model Application No. 60-192592 filed in the name of the assignee of the present application. This drain valve 74 includes: a fixing bolt 75 screwed in the threaded hole 73; a cylindrical hollow valve body 76 threadedly engaging the fixing bolt 75; a cylindrical connector 77 to which a suitable drain conduit is connected; and an adjusting member 78 manipulated to rotate the valve body 76, for adjusting the axial position of the valve body 76 relative to the fixing bolt 75. The valve body 76 has a comparatively small air vent 80 formed in the center of its closed end wall, and a pair of water vents 82, 82 in its cylindrical wall. Through these air vent 80 and water vents 82, 82, the interior of the lower cap 30 communicates with the external drain conduit. One end of an elongate pin 84 loosely engages the air vent 80, so that the plugging of the vent 80 with dirt or dust may be easily eliminated by a vertical movement of the pin 84. The area of communication of the water vents 82, 82 with the interior of the lower cap 30 may be adjusted by axially moving the threaded valve body 76 relative to the fixing bolt 75, by manipulating the adjusting member 78.

The lower half 60 accommodating therein the porous structure 70 and provided at its bottom wall 72 with the drain valve 74 is held at its open end, in sealing abutment with the open end of the upper half 58, through a gasket 86 interposed therebetween. The upper half 58 is secured to the lower half 60, by four fixing bolts 88 extending through respective bolt holes 87 formed at four corners of the lower half 60. Thus, the fluid-tight lower cap 30 is provided.

The lower gasket 28 is received within the annular recess 64 in the outer surface of the top wall 62 of the upper half 58 of the lower cap 30, such that the inner and outer peripheries of the lower gasket 28 are clamped between the top wall 62 of the lower cap 30, and the faces of the corresponding axial ends of the inner and outer tubes 10, 16. In this manner, the lower cap 30 is held in sealing engagement with the double-walled tube filter assembly 22, so as to close the lower open end of the assembly 22. It will be understood from the figures heretofore referred to, that the interior of the first filter 14 communicats with the enclosed space 61 within the lower cap 30, through the array of perforations 68 formed through the top wall 62 of the upper half 58. Further, the interior of the second filter 20 communicates with the enclosed space 61 through the array of perforations 54 formed through the lower gasket 28, and through the array of perforations 66 formed through the top wall 62.

The double-walled tube filter assembly 22 whose axial opposite open ends are held in communication with the upper and lower caps 26, 30 is fluid-tightly sandwiched and clamped by and between the upper and lower caps, by means of four fixing bolts 94 which extend through respective bolt holes 90 formed at four corners of the upper cap 26, and which are threaded in respective tapped holes 92 formed in the upper half 58 of the lower cap 30. Thus, the upper and lower caps 26, 30 and the filter assembly 22 are assembled into the present in-line filter device for compressed air.

The thus constructed in-line filter device is connected at its inlet opening 42 to the upstream side of a compressed-air conduit and at its outlet opening 44 to the downstream side of the conduit. In operation, compressed air entering the inlet opening 42 is first directed into the interior of the first filter 14, via the passage 46 and the circular opening 48, and is passed through the inner pad 12. During passage of the compressed air through the pad 12, water and/or oil vapor or liquid particles contained in the compressed air are coalesced into droplets, which are carried by the compressed air, into the lower cap 30 through the perforations 68. Since the cross dimension to air flow within the enclosed space 61 is greater than that within the first filter 14, the velocity of the air entering the enclosed space 61 is reduced and the entrained droplets carried by the air flow are separated from the air, and fall by gravity and centrifugal force toward the lower portion of the enclosed space 61, whereby the droplets are introduced into the porous structure 70. In this connection, it is noted that the porous structure 70 prevents substantial air movement within the honeycomb construction thereof, and therefore revaporization is substantially eliminated. The droplets thus trapped in the porous structure 70 flow therethrough and on the downwardly inclined concave surface 71 of the bottom wall 72, while being coalesced into flows which are eventually led into the central circular recess 69, and are discharged out of the filter device, through the drain valve 74.

The compressed air stream, which is thus dried to a substantial degree, is then directed through the perforations 66 into the interior of the second filter 20, and is passed through the outer pad 18. As the air stream passes through the pad 18, water and/or oil remaining as liquid particles within the compressed air are completely vaporized. As a result, the compressed air free of water and/or oil particles is fed to the downstream side of the compressed air conduit, through the annular opening 50, annular groove 52, and outlet opening 44.

In the thus constructed in-line filter device, the first and second filters 14 and 20 are provided in the form of the unitary double-walled tube filter assembly 22. Hence, the present filter device can be made effectively compact and small-sized, and the space required for the connection of the in-line filter device to the compressed air conduit or line can be considerably minimized. This facilitates the installation of the in-line filter device at an operationally desired location, namely, near a pneumatically operated component, so that the filter device can serve its function to provide an improved filtering effect.

Since the first and second filters 14, 20 are provided as coaxial inner and outer parts of a single double-walled tubing structure of the filter assembly 22, the number of the fixing bolts 94 which extend between the upper and lower caps 26, 30 can be reduced, as compared with that of the bolts required in a conventional filter device wherein two different filters are incorporated in two tubular housings which are spaced apart from each other laterally of a compressed air line. Consequently, the fixing bolts 94 can be easily tightened with even forces, whereby it is possible to avoid leakage of the compressed air due to otherwise possible uneven tightening forces of the fixing bolts.

Further, the coaxial alignment of the first and second filters 14, 20 of the instant filter device is advantageously combined with the vertical orientation of the honeycomb passages of the porous structure 70 received within the lower cap 30 which serves to provide communication between the corresponding open ends of the first and second filters 14, 20. That is, the vertical honeycomb orientation of the porous structure 70 coincides with the direction of flow of the compressed air stream into the lower cap 30, whereby droplets formed as a result of coalescence of water and/or oil vapor contained in the flowing compressed air may be readily trapped within the lower cap 30. Further, the provision of the drain valve 74 right below the center of the lower open end of the first filter 14 allows for very easy draining of the filter device by means of the drain valve 74. Thus, the present filter device assures trapping and draining of droplets of water and/or oil contained in the compressed air passed through the first filter 14.

Another advantage of the filter device of the present embodiment is offered by the air vent 80 of the valve body 76, which permits a small volume of air to be discharged out of the device, together with the droplets, thereby effectively preventing condensation of water vapor within the compressed-air conduit, while the compressed air is not consumed by a pneumatically operated component. Furthermore, the air vent 80 is effective to avoid a blow of the condensed water from the conduit into the pneumatic component, when an operation of the pneumatic component is initiated.

To facilitate the removal of moisture or water vapor from the compressed air based on the principle of heat gain or loss wherein the air adiabatically cools as it expands and heats as it is compressed, it is desirable that the following relation in the cross sectional areas of the various volumes of the filter assembly be satisfied. Namely, the cross sectional area of the inner tube 10 is larger than that of the inlet opening 42, and the cross sectional area of the enclosed volume 61 is larger than that of the inner tube 10. Further, the cross sectional area of the annular space between the inner and outer tubes 10, 16 is smaller than that of the enclosed volume 61, and the cross-sectional area of the outlet opening 44 is smaller than that of the annular space indicated above. According to this arrangement, the compressed air expands and cools as it enters from the inlet opening 42 into the inner tube 10 and then into the enclosed volume 61. The cool air holds less moisture than hot air, so that by cooling the air, more water can be coalesced and vaporized. As the air flows from the enclosed volume 61 into the outlet opening 44 through the annular space between the inner and outer tubes 10, 16, the air is compressed and accordingly warmed. The warm air is capable of holding more water vapor, so that any remaining vapor does not readily recondense into a water droplet. Thus, the arrangement satisfying the above-indicated cross sectional area relation results in improving the drying of the compressed air while it passes through the filter assembly.

While the presently preferred embodiment of the invention has been described and illustrated in detail, for illustrative purpose only, it is to be understood that the invention is not limited to the precise details of the illustrated embodiment.

In the illustrated embodiment, the first filter 14 (pad 12) is provided within the inner tube 10 while the second filter 20 (pad 18) is provided within the annular space between the inner and outer tubes 10, 16. However, it is obviously possible to reverse the arrangement, i.e., to provide the second filter within the inner tube 10, and the first filter between the inner and outer tubes 10, 16. In this case, too, the advantages described above with respect to the illustrated embodiment may be offered.

Although the pad 12 used for the first filter 14 of the illustrated embodiment is made of wound stainless steel mesh fibers, the pad 12 may be made of other metal wire mesh fibers or fabrics as disclosed in the U.S. Pat. No. 2,521,785 (which is hereby incorporated by reference), which are adapted to promote coalescence of vapor or liquid particles in the compressed air passing therethrough, into droplets. Also, the pad 18 of the second filter 20, which is wholly made of fabric material in the illustrated embodiment, may be suitably made of alternating spiral layers of wire mesh and absorbent fabric such as cotton fabric. For further details of the pad 18, reference is made to U.S. Pat. No. 4,116,650, and U.S. Pat. No. 4,400,187, which are hereby incorporated by reference.

While the porous structure 70 used in the illustrated embodiments consists of honeycomb blocks, other porous structures such as one-way pads used for baby diapers may be obviously employed, provided that such porous structures are capable of trapping droplets from the first filter 14, and effectively preventing substantial movements of air therewithin.

Although the illustrated filter assembly uses the drain valve 74, this valve may be replaced by a one-piece porous body.

While the illustrated filter assembly is designed so as to be installed in a vertical position on the compressed air pipe, it is possible to design the filter assembly so that the assembly is oriented in a horizontal position on the pipe. The horizontal orientation may be used for flexible pipes or conduits at construction locations, for example.

It will be obvious that the present invention may be embodied with various other changes, modifications and improvements, which may occur to those skilled in the art, without departing from the spirit of the invention, and which fall within the scope of the invention defined in the following claims.

What is claimed is:

1. An in-line filter device including first filter means having a first pad adapted to coalesce vapor or liquid particles contained in compressed air passing therethrough, into droplets, trapping means for trapping the droplets and thereby separating the droplets from the compressed air, and second filter means having a second pad through which is passed the compressed air which has passed said first filter means, the second pad being adapted to vaporize residual liquid particles remaining in the compressed air which has passed the first filter means, said in-line filter device comprising:

a double-walled tube filter assemby including an inner tube and an outer tube which are disposed in radially spaced, and coaxial relation with each other, so as to define an annular space therebetween, one of said inner tube and said annular space being filled with said first pad, so as to provide said first filter means, while the other of said inner tube and said annular space being filled with said second pad, so as to provide said second filter means;

an upper cap disposed in sealing engagement with an upper open end of said double-walled tube filter assembly, for fluid-tight communication therewith, said upper cap having an inlet opening which communicates with an upper open end of one of said inner tube and said annular space, and an outlet opening which communicates with an upper open end of the other of said inner tube and said annular space, said inlet opening receiving the incoming compressed air, while said outlet opening being adapted to deliver the filtered compressed air; and a lower cap disposed in sealing engagement with a lower open end of said double-walled tube filter assembly, for fluid-tight communication therewith, said lower cap having an enclosed space which communicates with lower open ends of said inner tube and said annular space, said enclosed space having a volume sufficient to reduce a velocity of the compressed air flowing into said enclosed space after passage thereof through said first filter means, said lower cap including a porous structure accomodated within said enclosed space, as said trapping means for trapping said droplets formed during passage of the compressed air through said first filter means, said lower cap further including drain means for discharging a mass of the droplets trapped by said porous structure, out of the filter device;

wherein said porous structure for trapping said droplets consists of a honeycomb structure accommodated in a lower portion of said enclosed space within said lower cap, such that passages formed through said honeycomb structure extend vertically.

2. An in-line filter device according to claim 1, wherein said drain means is disposed in a central portion of a bottom wall of said lower cap which defines a bottom of said enclosed space, so that said drain means is located right below the lower open end of said inner tube, said bottom wall having an internal concave surface which is inclined downwardly toward said central portion of the bottom wall.

3. An in-line filter device according to claim 1, wherein said inner tube is filled with said first pad while said annular space between said inner and outer tubes is filled with said second pad.

4. An in-line filter device according to claim 1, wherein said lower cap consists of a generally box-like upper half having a top wall in sealing engagemnt with said lower open ends of said inner tube and said annular space, and a generally box-like lower half having a bottom wall in sealing abutment with an open end of said upper half, said lower half accommodating said porous structure, and said bottom wall supporting said drain means.

* * * * *